United States Patent
Lee (10) Patent No.: US 12,286,169 B2
(45) Date of Patent: Apr. 29, 2025

(54) STEER-BY-WIRE APPARATUS OF HOST VEHICLE AND CONTROL METHOD THEREOF

(71) Applicant: HL MANDO CORPORATION, Pyeongtaek-si (KR)

(72) Inventor: Jung-Ae Lee, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/224,422

(22) Filed: Jul. 20, 2023

(65) Prior Publication Data
US 2024/0253694 A1   Aug. 1, 2024

(30) Foreign Application Priority Data
Jan. 30, 2023   (KR) .................... 10-2023-0011673

(51) Int. Cl.
*B62D 5/04* (2006.01)
*B62D 5/00* (2006.01)
*B62D 15/02* (2006.01)

(52) U.S. Cl.
CPC ............. *B62D 5/046* (2013.01); *B62D 5/001* (2013.01); *B62D 5/049* (2013.01); *B62D 15/0215* (2013.01); *B62D 15/0235* (2013.01)

(58) Field of Classification Search
CPC ........ B62D 5/046; B62D 5/001; B62D 5/049; B62D 15/0215; B62D 15/0235
See application file for complete search history.

(56) References Cited

U.S. PATENT DOCUMENTS

| | | | | |
|---|---|---|---|---|
| 2002/0013646 A1* | 1/2002 | Nishizaki | .............. | B60T 8/1764 180/443 |
| 2002/0108804 A1* | 8/2002 | Park | ...................... | B62D 5/005 180/444 |
| 2002/0161499 A1* | 10/2002 | Radamis | ................ | B62D 5/003 701/41 |
| 2004/0193344 A1* | 9/2004 | Suzuki | .................... | B60T 8/885 180/443 |
| 2015/0291210 A1* | 10/2015 | Kageyama | ............... | B62D 5/04 701/41 |
| 2015/0367887 A1* | 12/2015 | Fujita | ..................... | B62D 5/049 701/41 |
| 2018/0093701 A1* | 4/2018 | Kodera | ................ | B62D 5/0478 |
| 2018/0346018 A1* | 12/2018 | Kataoka | ............... | B62D 5/0463 |

* cited by examiner

*Primary Examiner* — Phutthiwat Wongwian
*Assistant Examiner* — Susan E Scharpf
(74) *Attorney, Agent, or Firm* — Hauptman Ham, LLP (57) ABSTRACT

The present disclosure provides a steer-by-wire system, including a reaction force motor for providing a reaction force in a direction opposite to the direction of operation of a steering wheel; a torque sensor for detecting a rotational angle of the steering wheel according to manipulation of the steering wheel; a motor position sensor for detecting a rotation angle of the motor; a turn counter for detecting the number of rotations of the reaction force motor; and a controller for calculating a first steering angle based on the rotation angle and number of rotations of the reaction force motor.

17 Claims, 4 Drawing Sheets

STEER-BY-WIRE APPARATUS OF HOST VEHICLE AND CONTROL METHOD THEREOF

CROSS-REFERENCE TO RELATED APPLICATION

This application claims priority to and the benefit of Korean Patent Application No. 10-2023-0011673, filed on Jan. 30, 2023, the disclosure of which is incorporated herein by reference in its entirety.

BACKGROUND

1. Field of the Invention

The present disclosure relates to a steer-by-wire apparatus of a host vehicle and a control method thereof, and more specifically to a steer-by-wire apparatus and a control method thereof that are capable of implementing a redundant safety mechanism.

2. Discussion of Related Art

The power steering of a vehicle is a steering apparatus based on power, and it serves to help a driver manipulate a steering wheel. Although the power steering method using hydraulic pressure has been mainly used, recently, the use of an electric power steering (EPS) system using the power of a motor has been increasing. The reason therefor is that the electric power steering system is lighter in weight, occupies less space and does not require oil change compared to the existing hydraulic power steering system.

Such an electric power steering system is configured by including a torque sensor that detects a steering torque generated by the rotation of a steering wheel and outputs an electrical signal that is proportional to the steering torque, an electronic control unit (ECU) that receives the electrical signal output from the torque sensor and outputs a motor driving signal, and a steering motor that generates an auxiliary torque based on the motor driving signal that is output from the ECU. The steering motor generates an auxiliary torque and transmits the generated auxiliary torque to a rack, a pinion gear or a steering column to assist the steering torque of a driver.

Recently, the steer-by-wire (SbW) system that removes a mechanical connection apparatus such as a steering column, universal joint or pinion shaft between a steering wheel and a vehicle wheel, and controls the driving of a motor connected to a rack with an electrical signal such that the steering of a vehicle is achieved has been developed and applied. This SbW system may be configured by including a steering wheel for the driver's steering operation, a reaction motor which is installed on one side of the steering wheel to provide a reaction force torque according to the rotation of a steering wheel, an actuator which is connected to the rack to implement the steering operation, a sensor for detecting a steering angle, a vehicle speed and a steering wheel torque, and an ECU for driving an actuator and a reaction force motor according to an electrical signal that is input from the sensor.

Meanwhile, as higher stability of the vehicle is required, the technology has been introduced in which a slave ECU is further provided in the SbW system to perform steering control through the slave ECU when an abnormality occurs in the master ECU.

Although this SbW system is provided with two torque sensors, there is a problem in that steering cannot be maintained because a steering angle cannot be calculated when both of torque sensors are faulty. In particular, since the steering wheel and the rack are mechanically separated in the SbW system, there is a problem in that steering by the driver's power is impossible without an ECU.

SUMMARY OF THE INVENTION

An object of the present disclosure is to provide a steer-by-wire system and a control method thereof, which are capable of implementing an additional redundant safety mechanism, by calculating a steering angle by using a motor position sensor provided in a reaction force motor without changing the system design, when both of torque sensors for calculating a steering angle are faulty.

The technical problems to be achieved in the present disclosure are not limited to the above-mentioned technical problem, and other technical problems that are not mentioned will be clearly understood by those skilled in the art from the description below.

In order to solve the above-described problems, the present disclosure provides a steer-by-wire apparatus of a host vehicle, including a first motor for providing a reaction force in a direction opposite to the direction of operation of a steering wheel; a first sensor for detecting a rotational angle of the steering wheel according to manipulation of the steering wheel; a second sensor for detecting a rotation angle of the motor; a counter for detecting the number of rotations of the motor; and a controller which is communicatively connected to the first sensor, the second sensor and the counter, and calculates a first steering angle based on the rotation angle and number of rotations of the motor.

Herein, the controller may determine whether the first sensor is faulty, and calculate the first steering angle based on the fact that the first sensor is faulty.

In addition, the controller may control a second motor based on the first steering angle.

In addition, the controller may calculate the first steering angle by multiplying the rotation angle of the first motor by the gear ratio of the first motor.

In addition, the controller may calculate an absolute angle that becomes a reference for the rotation angle of the first motor based on the number of rotations of the first motor.

In addition, the controller may calculate the first steering angle by aligning the rotation angle of the first motor based on the absolute angle.

In addition, the controller may calculate the second steering angle based on the rotation angle of the steering wheel and the number of rotations of the first motor based on the fact that the first sensor is normal.

In addition, the controller may calculate an absolute angle that becomes a reference for the rotation angle of the steering wheel based on the number of rotations of the first motor.

In addition, the controller may calculate the second steering angle by aligning the rotational angle of the steering wheel based on the absolute angle.

In addition, the controller may calculate the first steering angle based on the fact that the first sensor is normal.

In addition, the controller may calculate an offset angle which is a difference between the first steering angle and the second steering angle.

In addition, the controller may correct the first steering angle by using the offset angle before the failure of the first sensor.

In addition, the first sensor may include a first torque sensor and a second torque sensor.

In addition, based on the fact that any one of the first torque sensor and the second torque sensor is faulty, the controller may calculate the second steering angle based on the rotation angle of the steering wheel detected by the remaining other one thereof.

In addition, the controller may calculate the first steering angle based on the fact that both of the first torque sensor and the second torque sensor are faulty.

In addition, the present disclosure provides a method for controlling a steer-by-wire apparatus of a host vehicle, which is a control method of a steer-by-wire apparatus of a host vehicle comprising a first motor for providing a reaction force in a direction opposite to the direction of operation of a steering wheel, the method including the steps of detecting, by a first sensor, a rotation angle of the steering wheel according to manipulation of the steering wheel; detecting, by a second sensor, a rotation angle of the first motor; detecting, by a counter, the number of rotations of the first motor; determining whether the first sensor is faulty; calculating a first steering angle based on the rotation angle and number of rotations of the first motor based on the fact that the first sensor is faulty; and controlling a second motor based on the first steering angle.

In addition, the present disclosure may further include calculating the first steering angle based on the fact that the first sensor is faulty, and calculating the second steering angle based on the rotation angle of the steering wheel and the number of rotations of the first motor; and calculating an offset angle which is a difference between the first steering angle and the second steering angle.

In addition, the present disclosure may further include correcting the first steering angle by using the offset angle before the failure of the first sensor.

According to the present disclosure, when an abnormality occurs in both of torque sensors for calculating a steering angle, the steering angle is calculated by using a motor position sensor provided in a reaction force motor without changing the system design, thereby implementing an additional redundant safety mechanism.

Effects of the present disclosure are not limited to those mentioned above, and other effects that are not mentioned will be clearly understood by those skilled in the art from the description below.

DETAILED DESCRIPTION OF THE EMBODIMENTS

Hereinafter, with reference to the accompanying drawings, the exemplary embodiments of the present disclosure will be described in detail so that those skilled in the art can easily practice the present disclosure. The present disclosure may be embodied in many different forms and is not limited to the exemplary embodiments set forth herein. In order to clearly describe the present disclosure in the drawings, parts that are irrelevant to the description are omitted, and the same reference numerals are assigned to the same or similar components throughout the specification.

In the present specification, terms such as "include" or "have" are intended to designate that there exists a feature, number, step, operation, component, part or combination thereof described in the specification, but it should be understood that it does not preclude the possibility of the presence or addition of one or more other features, numbers, steps, operations, components, parts or combinations thereof.

Figure 1:
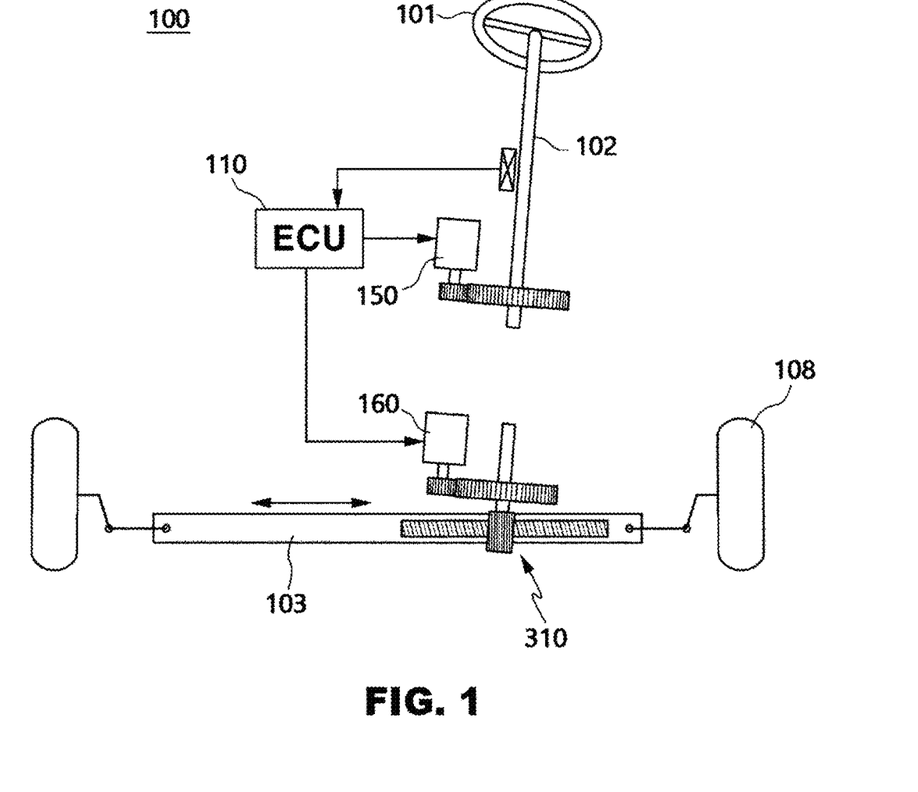
FIG. 1 is a diagram schematically showing a steer-by-wire system according to an exemplary embodiment of the present disclosure.

FIG. 1 is a diagram schematically showing a steer-by-wire system according to an exemplary embodiment of the present disclosure.

The steer-by-wire system 100 may include a steering input actuator 210, a controller 110 and a steering output actuator 310. In the steer-by-wire system 300, the steering input actuator 210 and the steering output actuator 310 are mechanically separated.

The steering input actuator 210 may refer to a device for inputting steering information intended by a driver to the controller 110. The steering input actuator 210 may include a steering wheel 101, a steering shaft 102, a reaction force motor 150 and a torque sensor 120.

The reaction force motor 150 may receive a control signal from the controller 110 and provide reaction force to the steering wheel 101 in a direction opposite to the direction in which the steering wheel 101 is operated. Specifically, the reaction force motor 150 may generate a reaction force torque by receiving command current from the controller 110 and driving at a rotational speed indicated by the command current.

The controller 110 may receive steering information from the steering input actuator 210, calculate a control value and output an electrical signal indicating the control value to the steering output actuator 310. Herein, the steering information may include a steering angle and steering torque.

Meanwhile, the controller 110 receives power information that is actually output from the steering output actuator 310 as feedback, calculates a control value and outputs an electrical signal instructing the control value to the steering input actuator 210, thereby providing a steering feeling (control feeling) to the driver.

The steering output actuator 310 may include a steering motor 160, a rack 103 and a wheel 108, and may further include a vehicle speed sensor and a rack position sensor.

The steering motor 160 may move the rack 103 in an axial direction. Specifically, the steering motor 160 receives command current from the controller 110 and drives the steering motor 160 to linearly move the rack 103 in the axial direction.

The rack 103 may perform linear motion by the driving of the steering motor 160, and the wheel 108 is steered left or right through the linear motion of the rack 103.

The steer-by-wire apparatus may further include a clutch that is capable of separating or coupling the steering input actuator 210 and the steering output actuator 310. Herein, the clutch may operate under the control of the controller 110.

Figure 2:
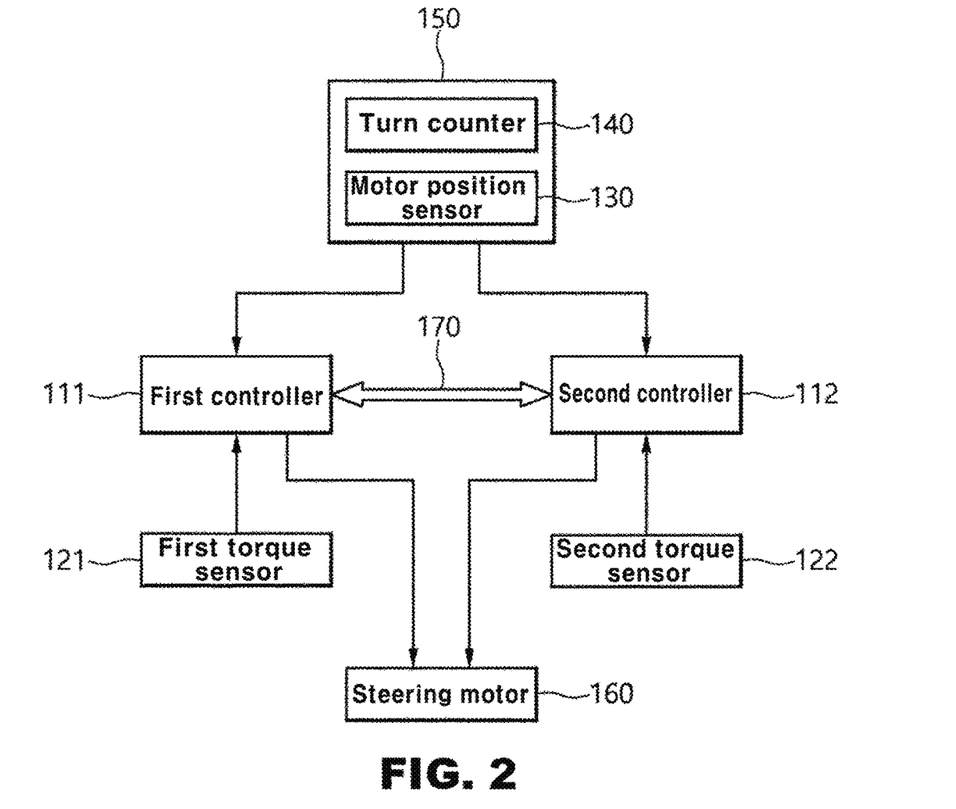
FIG. 2 is a block diagram of a steer-by-wire system according to an exemplary embodiment of the present disclosure.

FIG. 2 is a block diagram of a steer-by-wire system according to an exemplary embodiment of the present disclosure.

Referring to FIG. 2, the steer-by-wire system 100 according to an exemplary embodiment of the present disclosure may be configured by including a first controller 111, a second controller 112, a first torque sensor 121, a second torque sensor 122, a reaction force motor 150 and a steering motor 160.

The reaction force motor 150 may be provided with a motor position sensor 130 and a turn counter 140. Herein, the motor position sensor 130 may detect the rotation angle of the reaction force motor 150, and the turn counter 140 may detect the number of rotations of the reaction force motor 150.

The first and second torque sensors 121, 122 may detect the steering torque corresponding to the steering force applied by the driver through the steering wheel 101 and the rotation angle of the steering wheel 101 according to the operation of the steering wheel 101.

The first and second torque sensors 121, 122 may input information about the detected steering torque and the rotation angle of the steering wheel 101 to the first and second controllers 111, 112.

The first controller 111 may be implemented with an input/output interface circuit for exchanging information with an external device provided in the vehicle, such as a torque sensor, a microcontroller (MCU) for controlling the motor while feedback-controlling the motor current based on the input information, and an electronic control unit (ECU) including a motor detection circuit or the like for detecting motor current supplied to the motor. Herein, the first controller 111 may operate as a master ECU. That is, the first controller 111 may control overall operations of the steer-by-wire system provided in the vehicle.

The first controller 111 may receive information about the steering torque detected by the first torque sensor 121. The first controller 111 may control the steering motor 160 to supply a motor torque related to steering based on input steering torque information, vehicle speed information and motor current information supplied to the motor. For example, the motor torque related to steering may include an auxiliary torque based on the driver's steering torque or reaction force torque.

The second controller 112 may be implemented with an input/output interface circuit for exchanging information with an external device provided in the vehicle, such as a torque sensor, a microcontroller (MCU) for controlling the motor while feedback-controlling a motor current based on the input information, and an ECU including a motor detection circuit for detecting a motor current supplied to the motor. Herein, the second controller 112 may operate as a slave ECU.

Meanwhile, although the drawings illustrate that the first controller 111 receives a steering torque from the first torque sensor 121 and the second controller 112 receives a steering torque that is input from the second torque sensor 122, the first and second controllers 111, 112 may maintain steering by using the remaining torque sensor when an abnormality occurs in any one of the first and second torque sensors 121, 122.

The first controller 111 may control the steer-by-wire system alone when an abnormality occurs in the second controller 112 and the steer-by-wire system does not operate normally. In addition, when the steer-by-wire system does not operate normally due to an abnormality in the first controller 111, the second controller 112 alone may control the steering assistance system. To this end, the first controller 111 and the second controller 112 may monitor mutual operation states through a communication interface 170 provided between the controllers 111, 112.

As described above, in the steer-by-wire system 100 according to an exemplary embodiment of the present disclosure, when the occurrence of an abnormality is recognized in any one of the first and second controllers 111, 112, the steer-by-wire system is controlled by the remaining controller that is normal, thereby implementing a redundant safety mechanism.

The communication interface 170 is built between the first controller 111 and the second controller 112 and can be used for mutual signal transmission and reception. For example, the communication interface 170 may be implemented as a CAN interface. However, this is just an example and the present disclosure is not limited thereto, and if it is an independent communication interface that can be used to transmit and receive signals between the first controller 111 and the second controller 112, it is not limited to the type or name thereof.

According to one example, the first controller 111 and the second controller 112 may be configured to transmit/receive signals representing information about each other's operating states through the communication interface 170 at predetermined cycles. According to another example, the first controller 111 and the second controller 112 may be configured to monitor whether they operate normally based on whether a signal that is output from a specific terminal of the other party is detected. In addition, as long as the operating state of these controllers 111, 112 can be monitored, the monitoring method is not limited to a specific method.

The first controller 111 may recognize that an abnormality related to the operating state of the second controller 112 has occurred, when a signal indicating the operating state information is not received from the second controller 112 or an abnormal occurrence signal is received.

In addition, the second controller 112 may recognize that an abnormality related to the operating state of the first controller 111 has occurred, when a signal indicating the operating state information is not received from the first controller 111 or an abnormal occurrence signal is received.

The first controller 111 may calculate a motor torque based on the steering torque received from the first torque sensor 121, and control the steering motor 160 to supply at least a part of the motor torque.

In addition, the second controller 112 may control the steering motor 160 to receive a torque message corresponding to the remaining part of the motor torque from the first controller 111 through the communication interface 170, and supply at least a part of the motor torque based on the torque message.

For example, the first and second controllers 111, 112 may respectively control the motor 160 to supply ½ of the motor torque.

Meanwhile, although the steer-by-wire system 100 according to the embodiment of the present disclosure is provided with two of first and second torque sensors 121, 122, when an abnormality occurs in both of the first and second torque sensors 121, 122, there is a problem in that the steering cannot be maintained because it is not possible to calculate the steering angle. In particular, in the steer-by-wire system, since the steering wheel 101 and the rack 103 are mechanically separated, there is a problem in that steering by the driver's power is impossible without an electronic control device.

In this way, when an abnormality occurs in both of the two torque sensors 121, 122, the present disclosure may implement an additional redundant safety mechanism, by using the motor position sensor 130 and the turn counter 140 provided in the reaction force motor 150 to calculate the steering angle without changing the system design.

Specifically, the controller 110 may receive the rotation angle and the number of rotations of the reaction force motor 150 that are input from the motor position sensor 130 and the turn counter 140, respectively, and calculate the first steering angle based on the rotation angle and number of rotations of the reaction force motor 150.

Herein, the controller 110 may determine whether the torque sensor 120 is faulty, and calculate the first steering angle when the torque sensor 120 is faulty. In this case, the meaning that the torque sensor 120 is faulty means that it is difficult to maintain the steering with the torque sensor 120 because both the first and second torque sensors 121, 122 are in a faulty state.

In addition, the controller 110 may control the steering motor 160 based on the calculated first steering angle. That is, the controller 110 may input a control signal corresponding to the first steering angle to the steering motor 160 and control the steering motor 160 to supply a motor torque according to the control signal.

The controller 110 may calculate the first steering angle by multiplying the rotation angle of the reaction force motor 150 by the gear ratio of the reaction force motor 150. Herein, since a value obtained by multiplying the rotation angle of the reaction force motor 150 by the gear ratio of the reaction force motor 150 is a relative angle, it is necessary to align the same based on an absolute angle.

To this end, the controller 110 may calculate an absolute angle that becomes a reference for the rotation angle of the reaction force motor 150 based on the number of rotations of the reaction force motor 150 that is input from the turn counter 140.

In addition, the controller 110 may calculate the first steering angle by aligning the rotation angle of the reaction force motor 150 based on the calculated absolute angle.

In contrast, the controller 110 may determine whether the torque sensor 120 is faulty, and receive the rotation angle of the steering wheel 101 and the number of rotations of the reaction force motor from the torque sensor 120 and the turn counter 140 when the torque sensor 120 is normal to calculate a second steering angle based on the rotation angle of the steering wheel 101 and the number of rotations of the reaction force motor 150. Herein, since the rotation angle of the steering wheel 101 is a relative angle, it is necessary to align the same based on an absolute angle.

To this end, the controller 110 may calculate an absolute angle that becomes a reference for the rotation angle of the steering wheel 101 based on the number of rotations of the reaction force motor 150 that is input from the turn counter 140.

In addition, the controller 110 may calculate the second steering angle by aligning the rotation angle of the steering wheel 101 based on the absolute angle.

Figure 3:
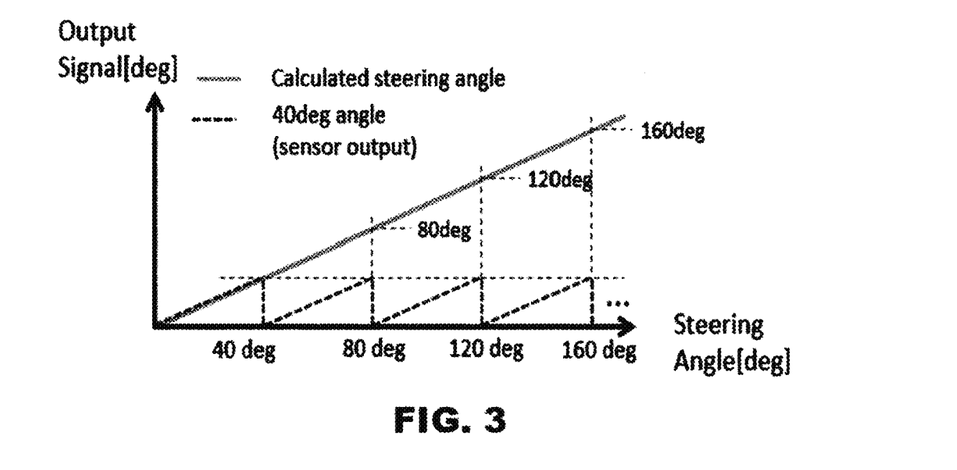
FIG. 3 is a graph for explaining the method of calculating a steering angle by using a torque sensor and a turn counter.

FIG. 3 is a graph for explaining the method of calculating a steering angle by using a torque sensor and a turn counter.

Referring to FIG. 3, the controller 110 may accumulate a signal corresponding to a rotational angle (relative angle) of the steering wheel 101 that is input from the torque sensor 120, for example, 40 degrees, and align the same based on an absolute angle which is calculated based on the number of rotations of the reaction force motor 150 that is input from the turn counter 140 to calculate the second steering angle.

The controller 110 may control the steering motor 160 based on the calculated second steering angle. That is, the controller 110 may input a control signal corresponding to the second steering angle to the steering motor 160 and control the steering motor 160 to supply a motor torque according to the control signal.

The controller 110 may determine whether the torque sensor 120 is faulty, and calculate the first steering angle even when the torque sensor is normal. In addition, the controller 110 may calculate an offset angle that is a difference between the first steering angle and the second steering angle.

In addition, the controller 110 may correct the first steering angle by using an offset angle before the torque sensor 120 is faulty, when the torque sensor 120 is faulty.

As such, the present disclosure continuously compares and checks the first steering angle calculated by using the motor position sensor 130 and the second steering angle calculated by using the torque sensor 120, and sets the first steering angle to be identical to the second steering angle, and when changing from the second steering angle to the first steering angle, it is possible to minimize steering heterogeneity.

According to the present disclosure described above, when any one of the torque sensor 121 and the second torque sensor 122 is faulty, the controller 110 calculates a second steering angle based on the rotation angle of the steering wheel 101 detected by the remaining other one, and when both of the first torque sensor 121 and the second torque sensor 122 are faulty, the controller calculates the first steering angle based on the rotation angle of the reaction force motor 150, thereby implementing an additional redundant safety mechanism.

Figure 4:
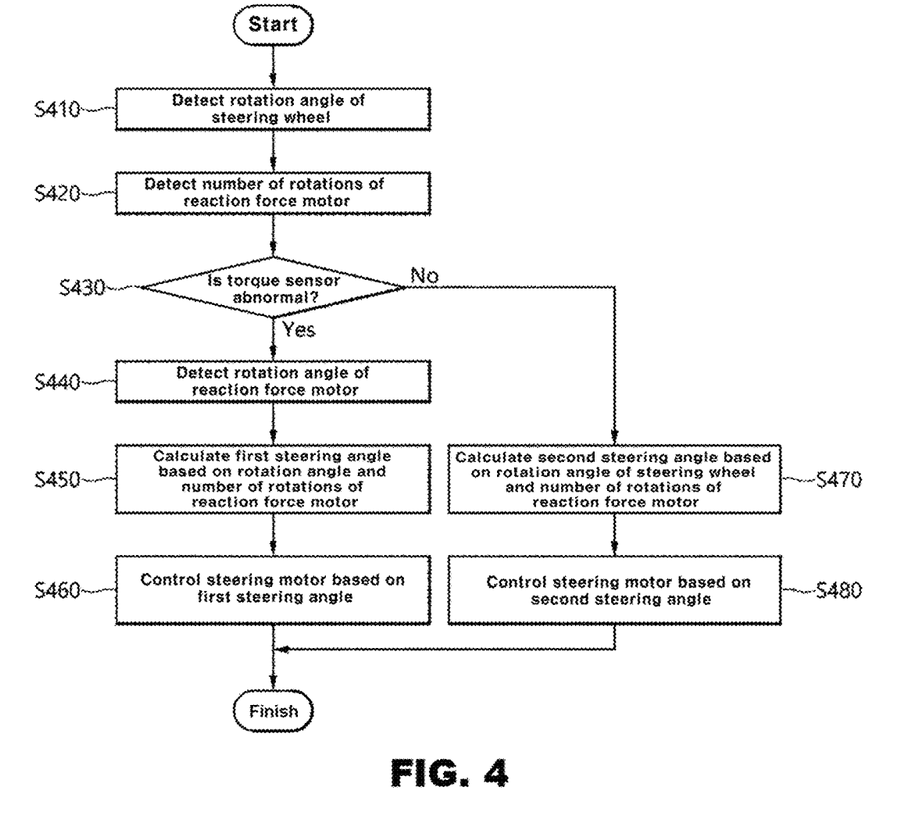
FIG. 4 is a flowchart of the method for controlling a steer-by-wire system according to an exemplary embodiment of the present disclosure.

FIG. 4 is a flowchart of the method for controlling a steer-by-wire system according to an exemplary embodiment of the present disclosure.

Referring to FIG. 4, first of all, the torque sensor 120 detects the rotational angle of the steering wheel 101 (S410), and the turn counter 140 detects the rotational speed of the reaction force motor 150 (S420).

Next, it is determined whether the torque sensor 120 is faulty (S430), and if there is an abnormality in the torque sensor 120, the motor position sensor 130 detects the rotation angle of the reaction force motor 150 (S440), and calculates a first steering angle based on the rotation angle and number of rotations of the reaction force motor 150 (S450).

Specifically, the first steering angle is calculated by multiplying the rotation angle of the reaction force motor 150 by the gear ratio of the reaction force motor 150. Herein, since a value obtained by multiplying the rotation angle of the reaction force motor 150 by the gear ratio of the reaction force motor 150 is a relative angle, it is necessary to align the same based on an absolute angle.

To this end, an absolute angle that becomes a reference for the rotational angle of the reaction force motor 150 is calculated based on the number of rotations of the reaction force motor 150 that is input from the turn counter 140. Then, the first steering angle is calculated by aligning the rotational angle of the reaction force motor 150 based on the calculated absolute angle.

Next, the steering motor 160 is controlled based on the first steering angle (S460). That is, by inputting a control signal corresponding to the first steering angle to the steering motor 160, the steering motor 160 is controlled to supply a motor torque according to the control signal.

Unlike this, it is determined whether the torque sensor 120 is faulty (S430), and when the torque sensor 120 is normal, the second steering angle is calculated based on the rotation angle of the steering wheel 101 and the number of rotations of the reaction force motor 150 (S470). In this case, since the rotation angle of the steering wheel 101 is a relative angle, it is necessary to align the same based on an absolute angle.

To this end, an absolute angle that becomes a reference for the rotation angle of the steering wheel 101 is calculated based on the number of rotations of the reaction force motor 150 that is input from the turn counter 140. Then, the second steering angle is calculated by aligning the rotation angle of the steering wheel 101 based on the calculated absolute angle.

Next, the steering motor 160 is controlled based on the second steering angle (S480). That is, by inputting a control signal corresponding to the second steering angle to the steering motor 160, the steering motor 160 is controlled to supply a motor torque according to the control signal.

In this way, when any one of the first torque sensor 121 and the second torque sensor 122 is abnormal, the present disclosure calculates the second steering angle based on the rotation angle of the steering wheel 101 detected by the remaining other one, and when both of the first torque sensor 121 and the second torque sensor 122 are abnormal, the present disclosure calculates the first steering angle based the rotation angle of the reaction force motor 150, thereby implementing an additional redundant safety mechanism.

Figure 5:
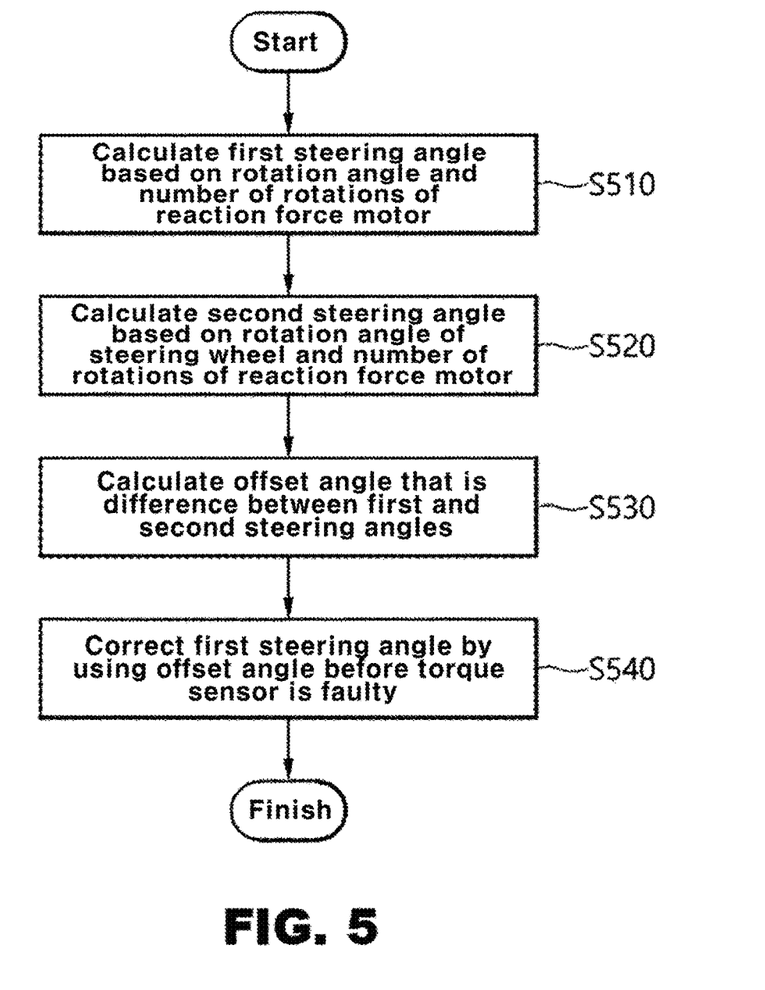
FIG. 5 is a flowchart of the method of correcting a steering angle calculated by using a motor position sensor according to an exemplary embodiment of the present disclosure.

FIG. 5 is a flowchart of the method of correcting a steering angle calculated by using a motor position sensor according to an exemplary embodiment of the present disclosure.

Referring to FIG. 5, first of all, when the torque sensor 120 is normal as a result of determining whether the torque sensor is faulty (S430), a first steering angle is calculated based on the rotation angle and number of rotations of the reaction force motor 150 (S510), and a second steering angle is calculated based on the rotational angle of the steering wheel 101 and the number of rotations of the reaction force motor 150 (S520).

Next, an offset angle that is a difference between the first steering angle and the second steering angle is calculated (S530).

Next, when the torque sensor 120 is faulty as a result of determining whether the torque sensor is faulty (S430), the first steering angle is corrected by using the offset angle before the torque sensor 120 is faulty (S540). That is, the first steering angle and the second steering angle may be set to be identical by adding or subtracting the offset angle from the first steering angle.

As such, the present disclosure may continuously compare and check the first steering angle calculated by using the motor position sensor 130 and the second steering angle calculated by using the torque sensor 120, and set the first steering angle to be identical to the second steering angle, and thus, when changing from the second steering angle to the first steering angle, it is possible to minimize steering heterogeneity.

Although an exemplary embodiment of the present disclosure has been described above, the spirit of the present disclosure is not limited to the exemplary embodiments presented herein, and those skilled in the art who understand the spirit of the present disclosure may easily suggest other exemplary embodiments by modifying, changing, deleting or adding components within the scope of the same spirit, but this will also fall within the scope of the present disclosure.

What is claimed is:

1. A steer-by-wire apparatus of a host vehicle, the apparatus comprising:

a first motor configured to provide a reaction force in a direction opposite to the direction of operation of a steering wheel;

a first sensor configured to detect a rotational angle of the steering wheel according to manipulation of the steering wheel;

a second sensor configured to detect a rotation angle of the first motor;

a counter configured to detect the number of rotations of the first motor; and a controller connected to the first sensor, the second sensor and the counter, and configured to calculate a first steering angle based on the rotation angle and number of rotations of the first motor, wherein the controller is configured to determine whether the first sensor is faulty, and calculate the first steering angle based on the fact that the first sensor is faulty.

2. The steer-by-wire apparatus of claim 1, wherein the controller is configured to control a second motor based on the first steering angle.

3. The steer-by-wire apparatus of claim 1, wherein the controller is configured to calculate the first steering angle by multiplying the rotation angle of the first motor by the gear ratio of the first motor.

4. The steer-by-wire apparatus of claim 1, wherein the controller is configured to calculate an absolute angle that becomes a reference for the rotation angle of the first motor based on the number of rotations of the first motor.

5. The steer-by-wire apparatus of claim 4, wherein the controller is configured to calculate the first steering angle by aligning the rotation angle of the first motor based on the absolute angle.

6. The steer-by-wire apparatus of claim 1, wherein the controller is configured to calculate a second steering angle based on the rotation angle of the steering wheel and the number of rotations of the first motor based on the fact that the first sensor is normal.

7. The steer-by-wire apparatus of claim 6, wherein the controller is configured to calculate an absolute angle that becomes a reference for the rotation angle of the steering wheel based on the number of rotations of the first motor.

8. The steer-by-wire apparatus of claim 7, wherein the controller is configured to calculate the second steering angle by aligning the rotational angle of the steering wheel based on the absolute angle.

9. The steer-by-wire apparatus of claim 6, wherein the controller is configured to calculate the first steering angle based on the fact that the first sensor is normal.

10. The steer-by-wire apparatus of claim 9, wherein the controller is configured to calculate an offset angle which is a difference between the first steering angle and the second steering angle.

11. The steer-by-wire apparatus of claim 10, wherein the controller is configured to correct the first steering angle by using the offset angle before the failure of the first sensor.

12. The steer-by-wire apparatus of claim 6, wherein the first sensor comprises a first torque sensor and a second torque sensor.

13. The steer-by-wire apparatus of claim 12, wherein based on the fact that any one of the first torque sensor and the second torque sensor is faulty, the controller is configured to calculate the second steering angle based on the rotation angle of the steering wheel detected by the remaining other one thereof.

14. The steer-by-wire apparatus of claim 12, wherein the controller is configured to calculate the first steering angle based on the fact that both of the first torque sensor and the second torque sensor are faulty.

15. A method for controlling a steer-by-wire apparatus of a host vehicle, which is a control method of a steer-by-wire apparatus of a host vehicle comprising a first motor for providing a reaction force in a direction opposite to the direction of operation of a steering wheel, the method comprising:
   detecting, by a first sensor, a rotation angle of the steering wheel according to manipulation of the steering wheel;
   detecting, by a second sensor, a rotation angle of the first motor;
   detecting, by a counter, the number of rotations of the first motor;
   determining whether the first sensor is faulty;
   calculating a first steering angle based on the rotation angle and number of rotations of the first motor based on the fact that the first sensor is faulty; and
   controlling a second motor based on the first steering angle.

16. The method of claim 15, further comprising:
   calculating the first steering angle based on the fact that the first sensor is faulty, and calculating a second steering angle based on the rotation angle of the steering wheel and the number of rotations of the first motor; and
   calculating an offset angle which is a difference between the first steering angle and the second steering angle.

17. The method of claim 16, further comprising:
   correcting the first steering angle by using the offset angle before the failure of the first sensor.

\* \* \* \* \*